US012209905B2

(12) United States Patent
Holmlund et al.

(10) Patent No.: US 12,209,905 B2
(45) Date of Patent: Jan. 28, 2025

(54) FABRY-PEROT INTERFEROMETER HAVING SUPPORTING ELEMENTS

(71) Applicant: Teknologian tutkimuskeskus VTT Oy, Espoo (FI)

(72) Inventors: Christer Holmlund, VTT (FI); Aki Keskisaari, VTT (FI); Ingmar Stuns, VTT (FI); Hans Toivanen, VTT (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 213 days.

(21) Appl. No.: 17/914,968

(22) PCT Filed: Mar. 30, 2021

(86) PCT No.: PCT/FI2021/050228
§ 371 (c)(1),
(2) Date: Sep. 27, 2022

(87) PCT Pub. No.: WO2021/198562
PCT Pub. Date: Oct. 7, 2021

(65) Prior Publication Data

US 2023/0152154 A1 May 18, 2023

(30) Foreign Application Priority Data

Mar. 31, 2020 (FI) .................................... 20205318

(51) Int. Cl.
*G01J 3/26* (2006.01)
*G01J 3/02* (2006.01)
(Continued)

(52) U.S. Cl.
CPC .............. *G01J 3/26* (2013.01); *G01J 3/0202* (2013.01); *G02B 26/001* (2013.01); *G02F 1/21* (2013.01)

(58) Field of Classification Search
CPC ........ G01J 3/26; G01J 3/0202; G02B 26/001; G02B 26/0833; G02B 5/284; G02F 1/21
See application file for complete search history.

(56) References Cited

U.S. PATENT DOCUMENTS 5,307,718 A 5/1994 Perry et al.
8,979,349 B2 * 3/2015 Bita .................... G02B 6/0065 362/621

(Continued)

FOREIGN PATENT DOCUMENTS

WO WO-2009039683 A1 * 4/2009 ............... G01J 3/26
WO 2013167811 A1 11/2013

OTHER PUBLICATIONS

Finnish Patent and Registration Office, Office Action, Mailed Oct. 28, 2020, 8 pages.

(Continued)

*Primary Examiner* — Hwa Andrew Lee
*Assistant Examiner* — Brodie Nathaniel Rowald
(74) *Attorney, Agent, or Firm* — Ziegler IP Law Group LLC.

(57) ABSTRACT

A Fabry-Perot interferometer includes
a first mirror plate with a first semi-transparent mirror,
a second semi-transparent mirror to define an optical cavity together with the first mirror, and
one or more first supporting elements to support the first mirror plate, wherein the first mirror plate has a first substantially planar surface and a second substantially planar surface defining the maximum thickness of the first mirror plate,
wherein the first mirror plate is bonded to the one or more first supporting elements by three or more joints,
wherein each joint is bonded to the first mirror plate at a bonding region, (Continued)

FPI0
GAP1
200
SZ
SX
M2
$d_F$
J0
GAP1
100
ACU2
ACU1
M1
J3
J0
J0
J3
BASE1
AX1
OPE1

Comparative Example wherein the distance between each bonding region and the first substantially planar surface is greater than 30% of the thickness of the mirror plate, and the distance between each bonding region and the second substantially planar surface is greater than 30% of the thickness of the mirror plate.

9 Claims, 11 Drawing Sheets

(51) Int. Cl.
*G02B 26/00* (2006.01)
*G02F 1/21* (2006.01)

(56) References Cited

U.S. PATENT DOCUMENTS

| | | | | |
|---|---|---|---|---|
| 2002/0015215 | A1 | 2/2002 | Miles | |
| 2007/0097479 | A1 | 5/2007 | Yasuda | |
| 2007/0171530 | A1 | 7/2007 | Nakamura | |
| 2012/0120404 | A1 | 5/2012 | Coffin | |
| 2015/0124263 | A1* | 5/2015 | Antila | G01B 9/02 356/519 |
| 2015/0205092 | A1 | 7/2015 | Sasagawa et al. | |
| 2016/0349423 | A1* | 12/2016 | Etchin | G01B 7/30 |
| 2017/0167919 | A1* | 6/2017 | Learmonth | G01J 3/0275 |

OTHER PUBLICATIONS

International Search Report, Application No. PCT/FI2021/050228, Mailed Jul. 2, 2021, 5 pages.
Written Opinion of The International Searching Authority, Application No. PCT/FI2021/050228, Mailed Jul. 2, 2021, 10 pages.
Berggren, Response to Office Action dated Feb. 4, 2022 issued by Finnish Patent and Registration Office, Application No. 20205318, dated Jun. 3, 2022, 65 pages.
Finnish Patent and Registration Office, Communication of Acceptance, FI Patent Application No. 20205318, dated Sep. 21, 2023, 5 pages.
Finnish Patent and Registration Office, Communication-Application can be accepted, dated Jan. 17, 2024, 3 pages.
Finnish Patent and Registration Office, Office Action, Application No. 20205318, dated Feb. 4, 2022, 6 Pages.
Finnish Patent and Registration Office, Office Action, Opinion on Formal Deficiencies, FI Patent Application No. 20205318, dated Dec. 13, 2023, 2 pages.
Berggren Oy, Claims (fi), FI Patent Application No. 20205318, dated Jan. 16, 2024, 3 pages.
Finnish Patent and Registration Office, Patent Specification, FI 130707 B1 for FI Patent Application No. 20205318, Patent granted date Jan. 31, 2024, 40 pages.
Finnish Patent and Registration Office, Decision, Patent Granted, FI Patent Application No. 20205318, dated Jan. 31, 2024, 2 pages.

* cited by examiner

FABRY-PEROT INTERFEROMETER HAVING SUPPORTING ELEMENTS

FIELD

The aspects of the disclosed embodiments relate to optical Fabry-Perot interferometers.

BACKGROUND

A Fabry-Perot interferometer comprises a pair of semi-transparent mirrors, which are arranged to operate as an optical cavity.

Referring to FIGS. 1*a* and 1*b*, a Fabry-Perot interferometer FPI of prior art may comprise a first mirror plate 100 and a second mirror plate 200. The first mirror plate 100 has a first semi-transparent mirror M1, and the second mirror plate 200 has a second semi-transparent mirror M2. The interferometer may comprise one or more actuators ACU1, ACU2 for changing the distance $d_F$ between the mirrors M1, M2.

The first mirror plate 100 may be bonded to a base plate BASE1 by one or more joints J0. The second mirror plate 200 may be bonded to the actuators ACU1, ACU2 by one or more joints J0. The actuators may be bonded to the base plate BASE1 by joints J3. Thermal expansion and/or shrinking of the joints J0, J3 may cause deforming forces FX1, FY1, FY2, which may cause significant geometric deformation (DEFORM1) of the mirrors. The geometric deformation of the shape of the mirrors may disturb or prevent operation of the Fabry Perot interferometer.

SUMMARY

The aspects of the disclosed embodiments are directed to provide a Fabry-Perot interferometer. An aspect of the disclosed embodiments is to provide a method for producing a Fabry-Perot interferometer. An aspect of the disclosed embodiments is to provide a spectrometer, which comprises a Fabry-Perot interferometer.

According to an aspect, there is provided a Fabry-Perot interferometer (300), comprising:

a first mirror plate (100) comprising a first semi-transparent mirror (M1), a second semi-transparent mirror (M2) to define an optical cavity together with the first mirror (M1), and one or more first supporting elements (S1) to support the first mirror plate (100), wherein the first mirror plate has a first substantially planar surface (SRF11) and a second substantially planar surface (SRF12) defining the maximum thickness ($h_{100}$) of the first mirror plate (100), wherein the first mirror plate (100) is bonded to the one or more first supporting elements (S1) by three or more joints (J1), wherein each joint (J1) is bonded to the first mirror plate (100) at a bonding region (REG1), wherein the distance ($d_1$) between each bonding region (REG1) and the first substantially planar surface (SRF11) is greater than 30% of the thickness ($h_{100}$) of the mirror plate (100), and the distance ($d_2$) between each bonding region (REG1) and the second substantially planar surface (SRF12) is greater than 30% of the thickness ($h_{100}$) of the mirror plate (100).

The interferometer may comprise a first semi-transparent mirror implemented on a first mirror plate, and a second semi-transparent mirror implemented on a second mirror plate. The interferometer may comprise one or more actuators to change the distance between the first mirror and the second mirror.

The width or diameter of the mirror plates of the interferometer may be e.g. in the range of 5 mm to 50 mm. The semi-transparent mirrors of the interferometer may be produced with a high degree of accuracy. The deviations of the semi-transparent mirror from the perfect planar shape may initially be e.g. smaller than $\lambda/200$, before the mirror plate is attached to the interferometer.

The parts of the interferometer may be connected to each other by joints, e.g. by adhesive joints. Thermal expansion of the joints, humidity-induced expansion of the joints, and/or shrinking of the joints may cause that deforming forces are transferred to the mirror plates of the interferometer. Adhesive joint may absorb moisture e.g. from ambient air, depending on the relative humidity of the ambient air.

The second mirror may be substantially parallel with the first mirror during operation. The parallelism of the second mirror with respect to the first mirror may be adjusted by using the actuators. However, geometric deformation of the shape of the mirror cannot be typically corrected by using the actuators.

The mirror plate may be supported by supporting elements, wherein the mirror plate may be bonded to supporting elements by joints. The positions of the bonding regions of the mirror plate may be selected to overlap with a middle plane of the mirror plate, so as to minimize deviations of the shape of the semi-transparent mirror from the initial shape. In particular, coupling the supporting and deforming forces to the mirror plate via bonding regions located at the middle plane may minimize bending of the mirror of the mirror plate. Coupling the supporting and deforming forces to the mirror plate via bonding regions located at the middle plane may ensure that deformations of the upper surface of the mirror plate may substantially compensate deformations of the lower surface of said mirror plate.

Local deviations of the shape of the semi-transparent mirror from the initial planar shape may preferably be smaller than e.g. $\lambda/500$. Local deviations of the shape of the semi-transparent mirror from the initial planar shape may preferably be smaller than e.g. 10 nm. Positioning the joints to overlap with the middle plane of the mirror plate may allow keeping the stress-induced deviations smaller than a predetermined limit, e.g. smaller than 10 nm.

BRIEF DESCRIPTION OF THE DRAWINGS

In the following examples, several variations will be described in more detail with reference to the appended drawings, in which.

DETAILED DESCRIPTION

Figure 2:
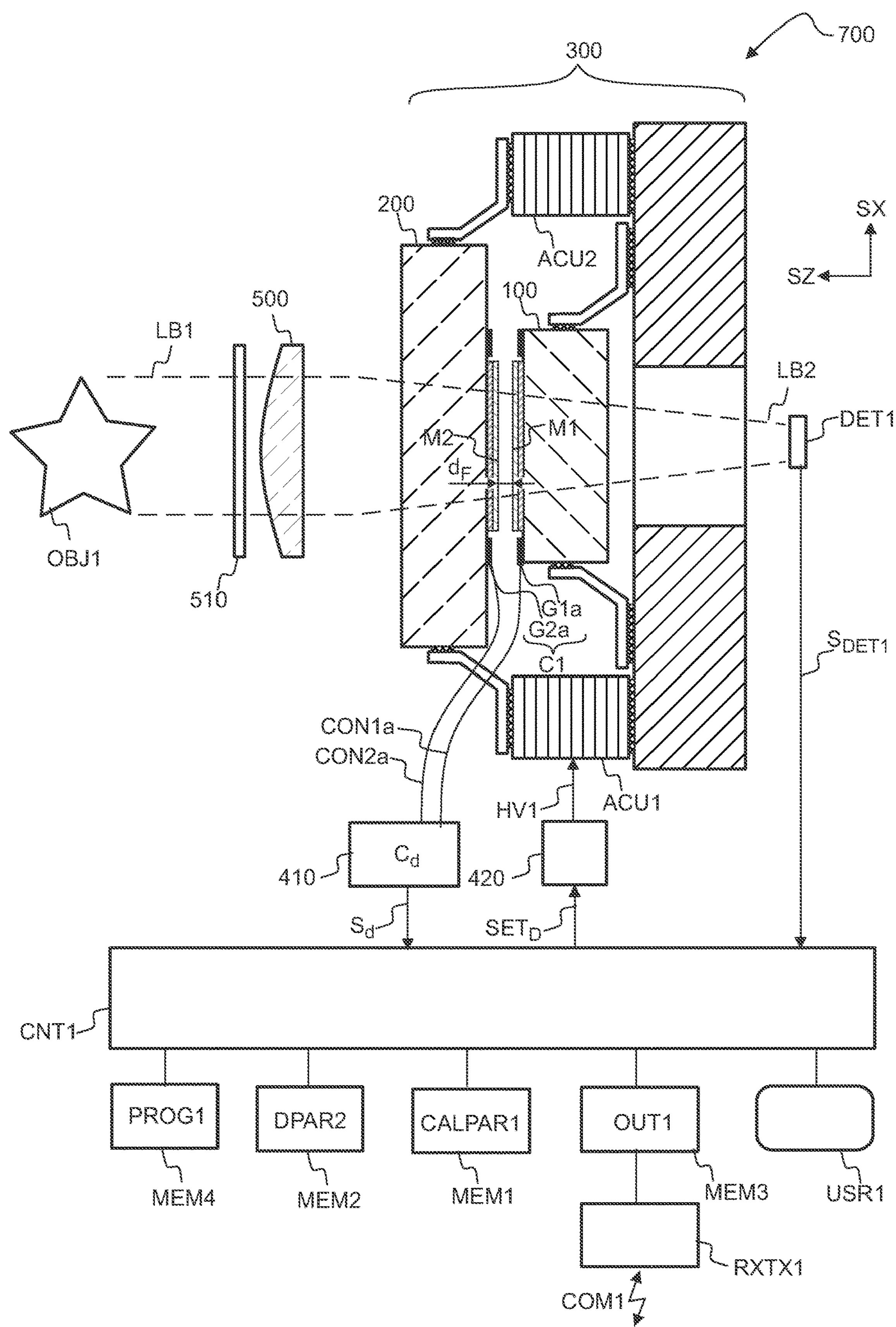
FIG. 2 shows, by way of example, in a cross-sectional side view, a spectrometer, which comprises a Fabry-Perot interferometer.

Referring to FIG. 2, a spectrometer 700 may comprise a Fabry-Perot interferometer 300. An object OBJ1 may reflect, emit and/or transmit light LB1, which may be transmitted through the interferometer 300 in order to monitor the spectrum of the light LB1. The interferometer 300 may be used e.g. for measuring reflection, transmission (absorption) and/or emission of the light LB1 of the object OBJ1.

The Fabry-Perot interferometer 300 comprises a first mirror plate 100 and a second mirror plate 200. The first mirror plate 100 comprises a first semi-transparent mirror M1, and the second mirror plate 200 comprises a second semi-transparent mirror M2. The mirrors M1, M2 may have e.g. a substantially circular form or a substantially rectangular form.

The distance $d_F$ between the mirrors M1, M2 may be adjusted to provide constructive interference for transmitted light at one or more given wavelengths so that the interferometer 300 may transmit light. The distance $d_F$ may also be adjusted to provide destructive interference for transmitted light at the given wavelength so that the interferometer 300 may reflect light.

The mirror distance $d_F$ may be adjusted by one or more actuators ACU1, ACU2. One or more actuators may be arranged to move the second mirror plate 200 with respect to the first mirror plate 100. The actuator ACU1, ACU2 may be e.g. a piezoelectric actuator, an electrostatic actuator, an electrostrictive actuator, or a flexoelectric actuator.

The spectrometer 700 may comprise a control unit CNT1. The control unit CNT1 may be arranged to send a control signal $SET_D$ to the interferometer 300 in order to adjust the mirror gap $d_F$. The interferometer 300 may comprise a driver unit 420. The driver unit 420 may e.g. convert a digital control signal $SET_D$ into an analog signal suitable for driving one or more actuators. The driver unit 420 may provide a signal HV1 for driving an actuator. The driver unit 420 may provide e.g. a high voltage signal HV1 for driving a piezoelectric actuator.

The mirrors M1, M2 may be substantially flat and substantially parallel to each other. The flatness of the mirror M1, M2 may be e.g. better than $\lambda_N/200$, in order to provide a suitable finesse (i.e. the ratio of the free spectral range to the spectral width of a transmission peak). $\lambda_N$ denotes a predetermined operating wavelength. The predetermined operating wavelength $\lambda_N$ may be e.g. in the range of 500 nm to 4000 nm. The predetermined operating wavelength $\lambda_N$ may be e.g. 2000 nm or 4000 nm.

The interferometer 300 may optionally comprise means for monitoring the distance $d_F$ between the mirrors and/or the mirror plates. The interferometer 300 may comprise e.g. capacitive means for monitoring the distance. The interferometer 300 may comprise e.g. inductive means for monitoring the distance. The interferometer 300 may comprise e.g. interferometric means for monitoring the distance.

Figure 7A:
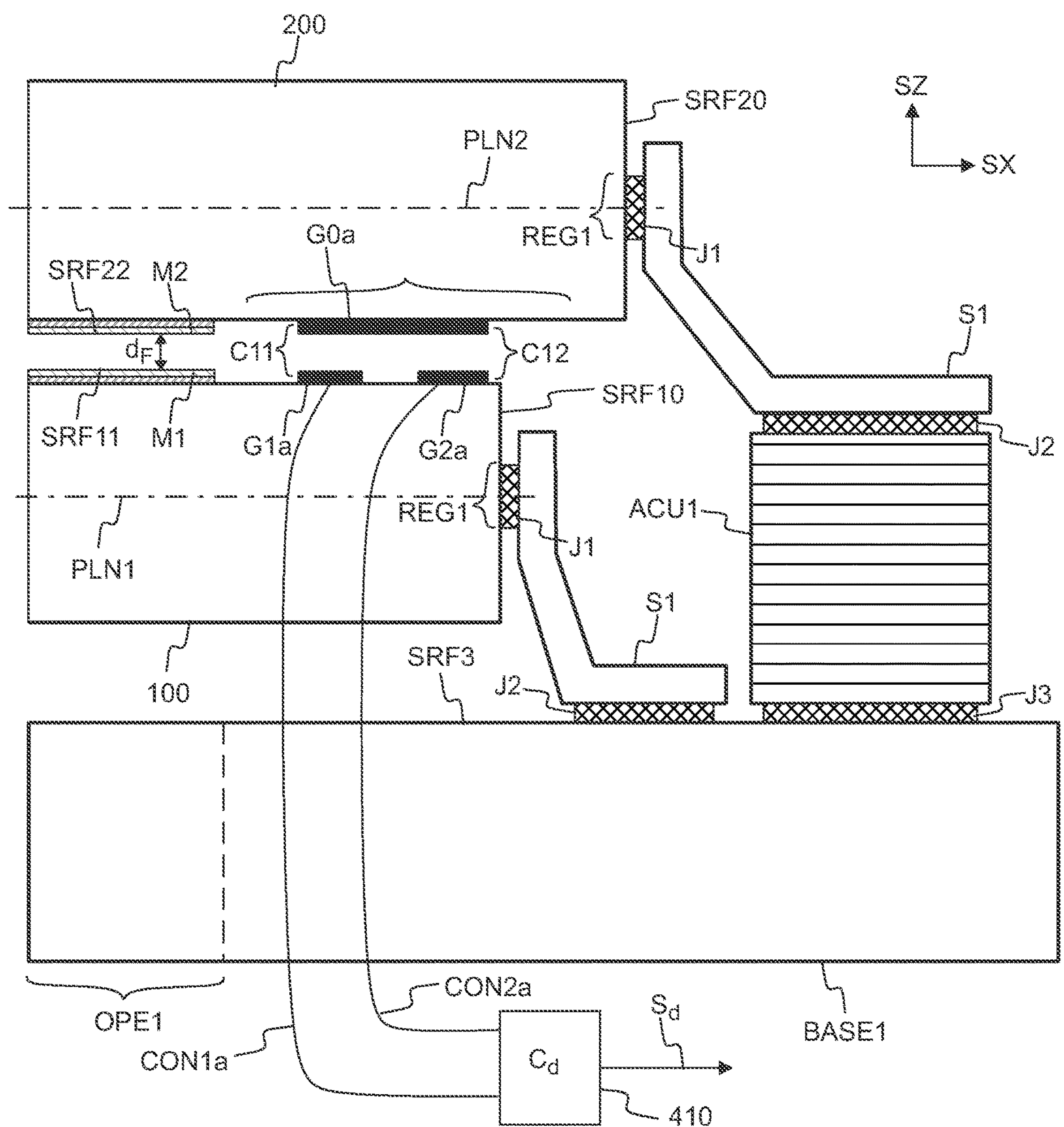
FIG. 7*a* shows, by way of example, in a side view, a capacitive sensor for monitoring the distance between the mirrors of the interferometer.

The interferometer 300 may optionally comprise capacitive sensor electrodes for capacitively monitoring mirror distance $d_F$. Sensor electrodes G1*a*, G2*a* may together form a sensor capacitor C1, wherein the capacitance value of the sensor capacitor C1 may depend on the mirror distance $d_F$. Consequently, the mirror distance $d_F$ may be monitored by monitoring the capacitance value of the sensor capacitor C1. The sensor capacitor C1 may be connected to a capacitance monitoring unit 410 e.g. by conductors CONa, CONb. The capacitance monitoring unit 410 may provide a sensor signal $S_d$ indicative of the mirror distance $d_F$. The sensor capacitor C1 may also be implemented e.g. as shown in FIG. 7*a*.

The capacitance monitoring unit 410 may provide a sensor signal $S_d$. The sensor signal may be used for monitoring the mirror gap $d_F$. The spectral response of the spectrometer 700 may be calibrated e.g. as a function of the mirror gap $d_F$. The spectrometer 700 may comprise a memory MEM2 for storing spectral calibration parameters DPAR2. The mirror gap $d_F$ and/or a spectral position $\lambda$ may be determined from the sensor signal $S_d$ e.g. by using the spectral calibration parameters DPAR2.

The interferometer 300 may also comprise two or more sensor capacitors for monitoring the parallelism of the mirrors M1, M2, in addition to monitoring the mirror distance $d_F$ between the mirrors M1, M2. The mirror M2 may be adjusted to be parallel with the mirror M1 e.g. by controlling one or more of the actuators ACU1, ACU2 of the interferometer 300. However, geometric deformation of the shape of the mirror M1 and/or M2 cannot be typically corrected by using the actuators ACU1, ACU2

The Fabry-Perot interferometer 300 may form transmitted light LB2 by filtering the light LB1 obtained from the object OBJ1. The spectrometer 700 may comprise an optical detector DET1. The interferometer 300 may be optically coupled to the detector DET1. The transmitted light LB2 may impinge on the detector DET1. The detector DET1 may be e.g. an image sensor or a non-imaging detector. The detector DET1 may provide one or more intensity signals $S_{DET1}$ indicative of the intensity of the transmitted light LB2.

The spectrometer 700 may optionally comprise imaging, focusing, or collimating optics 500. The optics 500 may be arranged to focus light LB2 to the detector DET1. The optics 500 may also be positioned between the interferometer 300 and the sensor DET1.

The interferometer 300 may also be positioned e.g. within multi-element optics 500. The interferometer 300 may be positioned between elements of multi-element optics 500.

The spectrometer 700 may optionally comprise a memory MEM1 for storing intensity calibration parameters CALPAR1. The spectrometer 700 may be arranged to obtain detector signal values $S_{DET1}$ from the detector DET1, and to determine intensity values $X(\lambda)$ from the detector signal values $S_{DET1}$ by using one or more intensity calibration parameters CALPAR1. At each mirror distance value $d_F$, an intensity value $X(\lambda)$ of the light LB1 may be determined from a detector signal $S_{DET1}$ by using the one or more intensity calibration parameters CALPAR1.

The spectrometer 700 may optionally comprise a memory MEM3 for storing output OUT1. The output OUT1 may comprise e.g. detector signals $S_{DET1}$ and/or intensity values determined from the detector signals. The output OUT1 may e.g. comprise one or more digital images of the object OBJ1, captured by using the interferometer 300 as a spectrally selective filter.

The spectrometer 700 may comprise a memory MEM4 for storing a computer program PROG1. The computer program PROG1 may be configured, when executed by one or more data processors (e.g. CNT1), cause the apparatus 300, 700 perform one or more of the following:

measure a distance $d_F$ between the mirrors M1, M2, set a transmittance peak of the interferometer 300 to a selected position, cause spectral scanning of the interferometer 300, measure a spectral intensity value, measure a spectrum, adjust parallelism (tilt angle) of the mirrors M1, M2.

The spectrometer 700 may optionally comprise a user interface USR1 e.g. for displaying information to a user and/or for receiving commands from the user. The user interface USR1 may comprise e.g. a display, a keypad and/or a touch screen.

The spectrometer 700 may optionally comprise a communication unit RXTX1. The communication unit RXTX1 may transmit and/or receive a signal COM1 e.g. in order to receive commands, to receive calibration data, and/or to send output data OUT1. The communication unit RXTX1 may have e.g. wired and/or wireless communication capabilities. The communication unit RXTX1 may be arranged to communicate e.g. with a local wireless network (Bluetooth, WLAN), with the Internet and/or with a mobile communications network (4G, 5G).

The spectrometer 700 may optionally comprise one or more optical cut-off filters 510 to limit the spectral response of the detector DET1.

SX, SY and SZ denote orthogonal directions. The light LB2 may propagate substantially in the direction −SZ. The optical axis AX1 of the interferometer 300 may be parallel with the direction SZ. The light LB2 may propagate substantially in the direction of the optical axis AX1. The light LB2 may propagate substantially in the direction −SZ.

Figure 3:
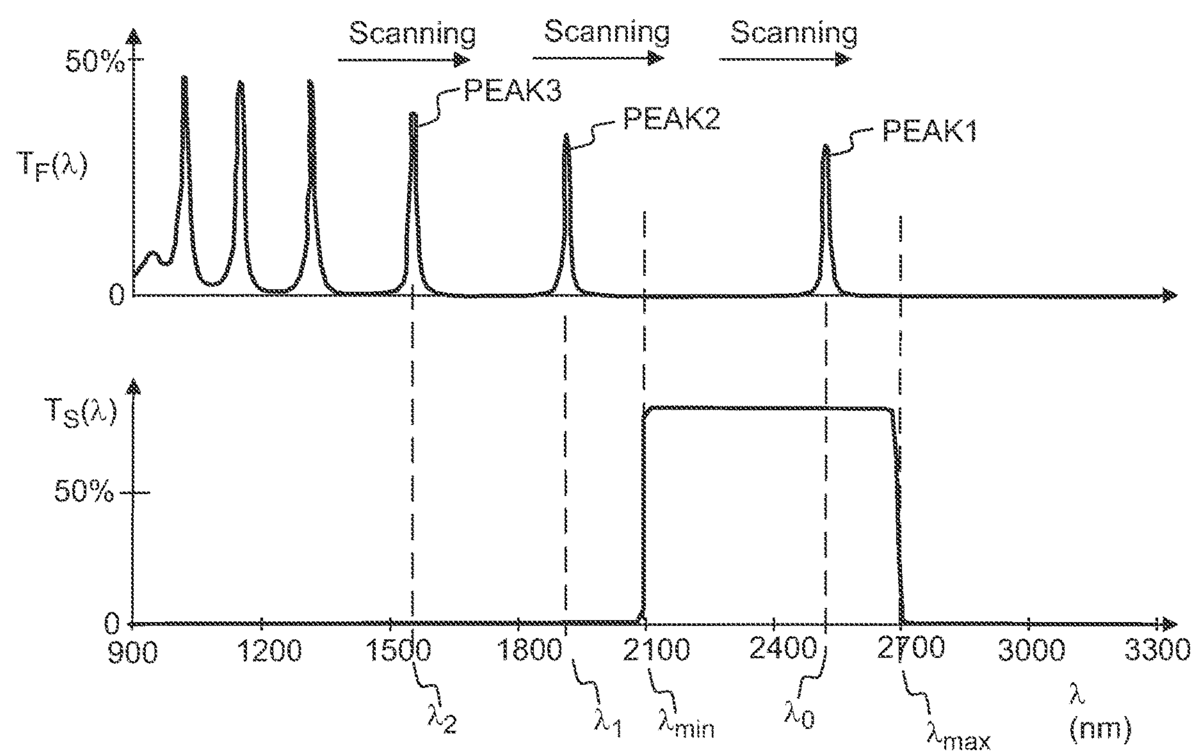
FIG. 3 shows, by way of example, spectral transmittance peaks of a Fabry-Perot interferometer.

FIG. 3 shows, by way of example, a spectral transmittance of a Fabry-Perot interferometer 300, and the pass band of an optional filter 510. The uppermost curve of FIG. 3 shows the spectral transmittance $T_F(\lambda)$ of the Fabry-Perot interferometer 300. The spectral transmittance $T_F(\lambda)$ may have one or more adjacent transmittance peaks PEAK1, PEAK2, PEAK3 of the Fabry-Perot interferometer 300. For example, a first transmittance peak PEAK1 may be at a wavelength $\lambda_0$, a second transmittance peak PEAK2 may be at a wavelength $\lambda_1$, and a third transmittance peak PEAK3 may be at a wavelength $\lambda_2$. The spectral positions $\lambda_0$, $\lambda_1$, $\lambda_2$ of the transmission peaks PEAK1, PEAK2, PEAK3 may depend on the mirror distance $d_F$ according to the Fabry-Perot transmission function. The spectral positions of the transmission peaks may be changed by changing the mirror gap $d_F$. The spectral positions of the transmission peaks may be changed by tuning the mirror gap $d_F$. The transmission peaks PEAK1, PEAK2, PEAK3 may also be called passbands of the Fabry-Perot interferometer.

The spectrometer 700 may optionally comprise one or more optical cut-off filters 510 to limit the spectral response of the spectrometer 700. The one or more filters 510 may together provide a spectral transmittance $T_S(\lambda)$. The one or more filters 510 may provide an optical band pass filter defined by cut-off wavelengths $\lambda_{min}$ and $\lambda_{max}$.

Figure 4A:
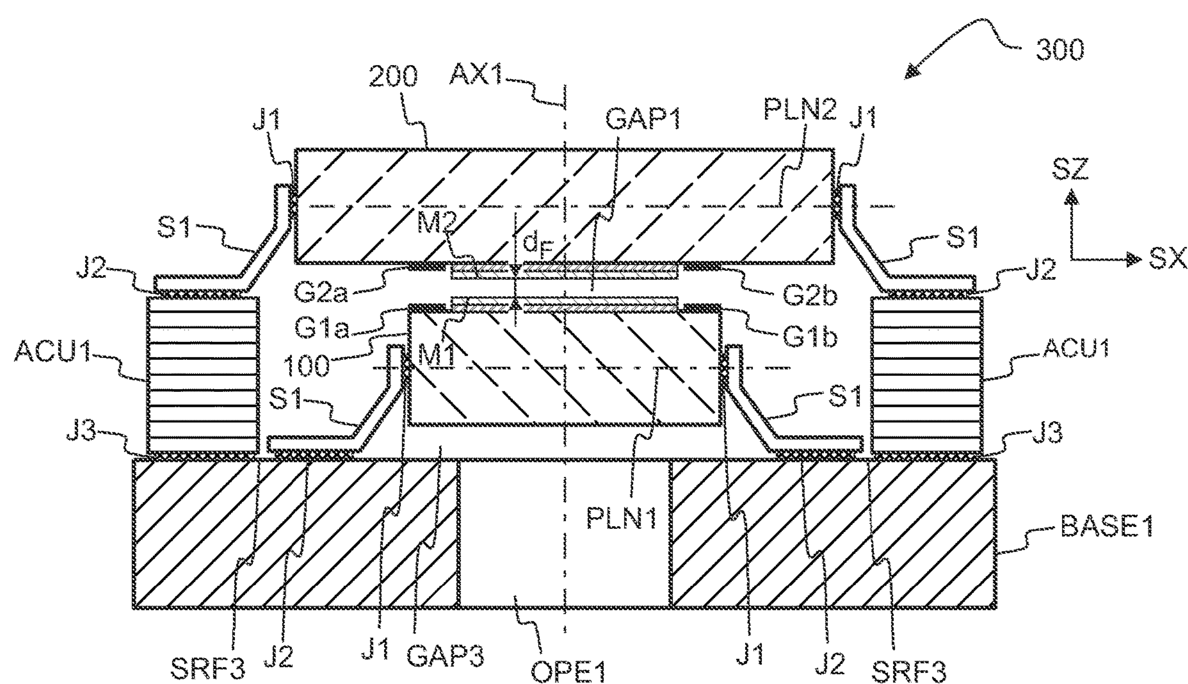
FIG. 4*a* shows, by way of example, in a cross-sectional side view, a Fabry-Perot interferometer.
Figure 4B:
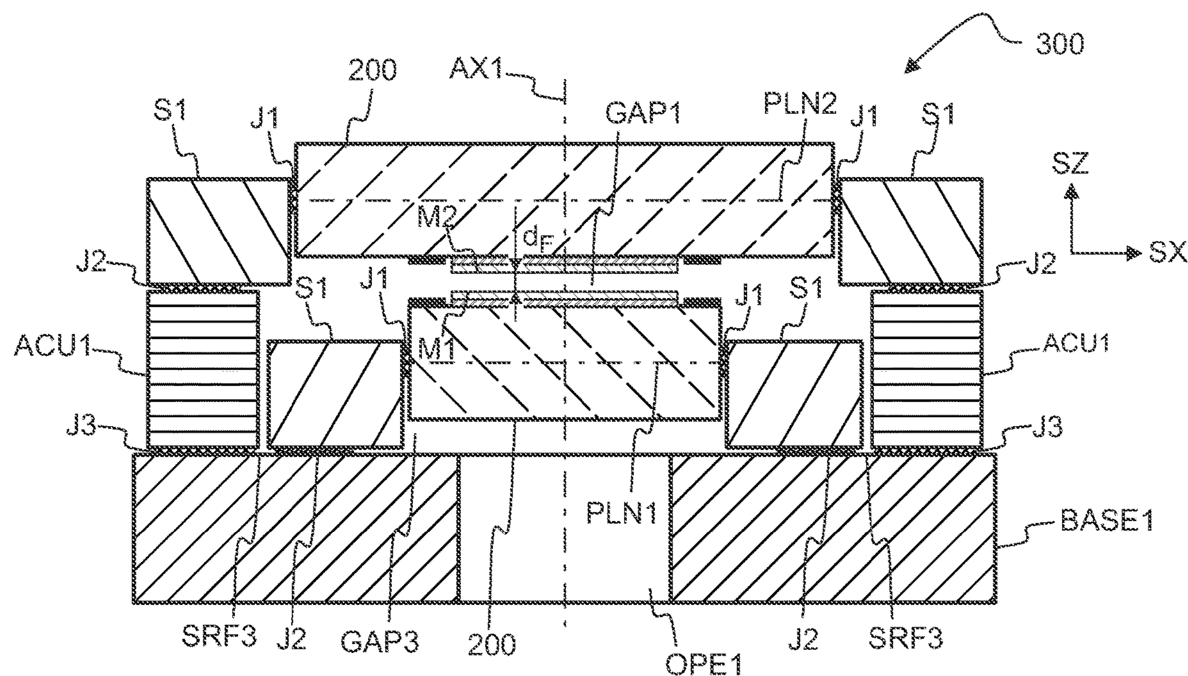
FIG. 4*b* shows, by way of example, in a cross-sectional side view, a Fabry-Perot interferometer.

Referring to FIGS. 4*a* and 4*b*, the Fabry-Perot interferometer 300 may comprise a first mirror plate 100, a second mirror plate 200, and one or more actuators ACU1, ACU2 to change the distance $d_F$ between the mirrors M1, M2 of the interferometer 300. The first mirror plate 100 may have a first semi-transmissive mirror M1, and the second mirror plate 200 may have a second semi-transmissive mirror M2. The M1, M2 may be planar with an accuracy, which is e.g. better than λ/200.

The width $w_{100}$ of the first mirror plate 100 may be e.g. in the range of 5 mm to 50 mm.

The distance $d_F$ between the semi-transparent mirrors M1, M2 may be e.g. in the range of 0.5 μm to 10 μm. The distance $d_F$ between the semi-transparent mirrors M1, M2 may be e.g. in the range of 0.2 μm to 10 μm.

The first mirror plate 100 may be stationary, and the second mirror plate 200 may be moved by the actuators ACU1, ACU2, with respect to the first mirror plate 100.

The Fabry-Perot interferometer 300 may comprise two or more actuators ACU1, ACU2 to change the distance $d_F$ between the mirrors M1, M2 of the interferometer 300 and/or to adjust the tilt angle between the mirrors M1, M2.

The first mirror plate 100 and/or the second mirror plate 200 may be supported by supporting elements S1. The supporting elements S1 may be e.g. bent pieces of metal sheet or blocks. The mirror plates 100, 200 may be bonded to the supporting elements S1 by joints J1. The joints J1 may be positioned close to the middle plane of the mirror plates 100, 200, so as to reduce deformation of the shape of the mirrors M1, M2.

The semi-transparent mirrors M1, M2 may be e.g. dielectric multilayer coatings deposited on a transparent substrate. The substrate material of the mirror plates 100, 200 may be transparent in the operating wavelength range of the interferometer 300. The material of the mirror plates 100, 200 may be e.g. glass, silica, silicon or sapphire.

The supporting elements S1 may e.g. comprise or consist of a metal, glass, silicon (Si), silica ($SiO_2$), sapphire ($Al_20_3$) or ceramic material. Supporting block elements S1 (FIG. 4*b*) may provide stable support for the mirror plate 100, 200.

Block elements S1 of FIG. 4*b* may sometimes transfer horizontal forces (e.g. in direction SX) to the mirror plate 100, 200. Using the slightly flexible supporting elements of FIG. 4*a* may reduce the magnitude of forces transferred to the mirror plate 100, 200, when compared with the supporting blocks of FIG. 4*b*. Flexible supporting elements S1 may e.g. comprise spring steel or Invar alloy (FeNi36).

The material of the supporting elements S1 for the stationary mirror plate (e.g. M1) may be selected such that the thermal expansion of the supporting elements S1 may at least partly compensate thermal expansion of the joints J2. The material of the supporting elements S1 for the movable mirror plate (e.g. M2) may be selected such that the thermal expansion of the supporting elements S1 may at least partly compensate thermal expansion of the joints J2, J3 and thermal expansion of the one or more actuators ACU1.

The slightly flexible supporting elements of FIG. 4*a* may provide a less stable support for the mirror plates, when compared with the supporting blocks of FIG. 4*b*. However, the reduced stability of the flexible elements S1 may be at least partly compensated by monitoring and correcting the position of the mirror plate 200 by using the actuators. The position of the mirror plate 200 may be monitored e.g. by using the capacitive sensor electrodes G1*a*, G2*a*, G1*b*, G2*b*. The position of the mirror plate 200 may be corrected by using the actuators ACU1, ACU2.

The interferometer 300 may comprise a base plate BASE1. The first mirror plate 100 and the second mirror plate 200 may be attached to the base plate BASE1 via the supporting elements S1.

The first mirror plate 100 may be bonded to the supporting elements S1 by joints J1. The support elements S1 of the first mirror plate 100 may be attached to the base plate BASE1 by joints J2. The support elements S1 of the first mirror plate 100 may be attached e.g. to a mounting surface SRF3 of the base plate BASE1 by the joints J2. The surface SRF3 may be e.g. substantially perpendicular to the optical axis AX1 of the interferometer 300.

The second mirror plate 200 may be bonded to the supporting elements S1 by joints J1. The support elements S1 of the second mirror plate 200 may be attached to the actuators ACU1, ACU2 by joints J2. The actuators ACU1, ACU2 may be attached to the base plate BASE1 by joints J2. The support elements S1 of the second mirror plate 200 may be attached e.g. to the mounting surface SRF3 by the joints J2.

The joints J1, J2, J3 may be e.g. adhesive joints. The joints J1, J2, J3 may comprise e.g. an adhesive (ADH1). In an embodiment, the joints J1, J2, J3 may also be formed e.g. by welding or soldering.

The interferometer 300 may be optionally assembled such that a gap GAP3 remains between the first mirror plate 100 and the base plate BASE1. The gap GAP3 may reduce the probability of causing deformation of the mirror plate 100.

The interferometer 300 may optionally comprise capacitive sensor electrodes (G1*a*, G2*a*, G1*b*, G2*b*) for monitoring the distance $d_F$ between the mirrors M1, M2 and/or for monitoring a tilt angle of the mirror M2 with respect to the mirror M1.

The first mirror plate 100 may comprise sensor electrodes G1*a*, G1*b*. The second mirror plate 200 may comprise sensor electrodes G2*a*, G2*b*. The electrodes G1*a* and G2*a* may together form a first sensor capacitor C1, which has a capacitance $C_1$. The electrodes G1*b* and G2*b* may together form a second sensor capacitor C2, which has a capacitance $C_2$. The sensor capacitors C1, C2 may also be implemented e.g. as shown in FIG. 7*a*.

The distance between the electrodes G1*a*, G2*a* may depend on the mirror distance $d_F$, and the capacitance $C_1$ of the first sensor capacitor C1 may depend on the distance between the electrodes G1*a*, G2*a* such that the mirror distance $d_F$ near the electrodes G1*a*, G2*a* may be monitored by monitoring the capacitance $C_1$ of the first sensor capacitor C1. The mirror distance $d_F$ close to the electrodes G2*a*, G2*b* may be monitored by monitoring the capacitance $C_2$ of the second sensor capacitor C2, respectively.

The mirror distance $d_F$ and/or tilt angle may also be monitored e.g. by analyzing one or more optical signals transmitted through the interferometer 300. The sensor electrodes may also be omitted.

The base plate BASE1 may optionally comprise an opening OPE1 for light LB1, LB2, which is transmitted through the interferometer 300.

Figure 5A:
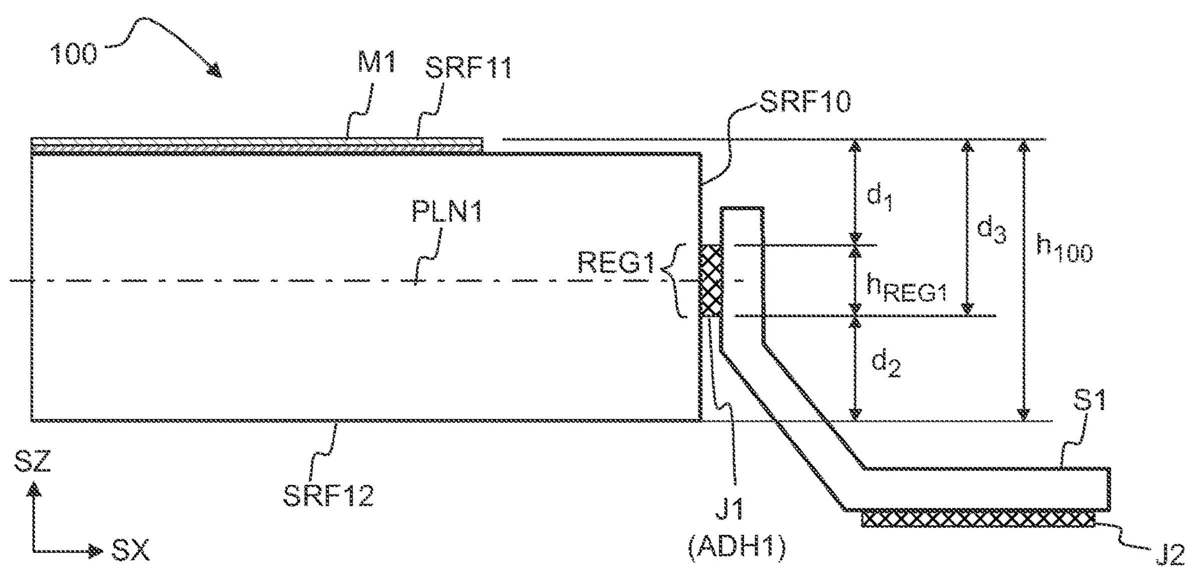
FIG. 5*a* shows, by way of example, in a side view, a joint of the mirror plate.
Figure 5B:
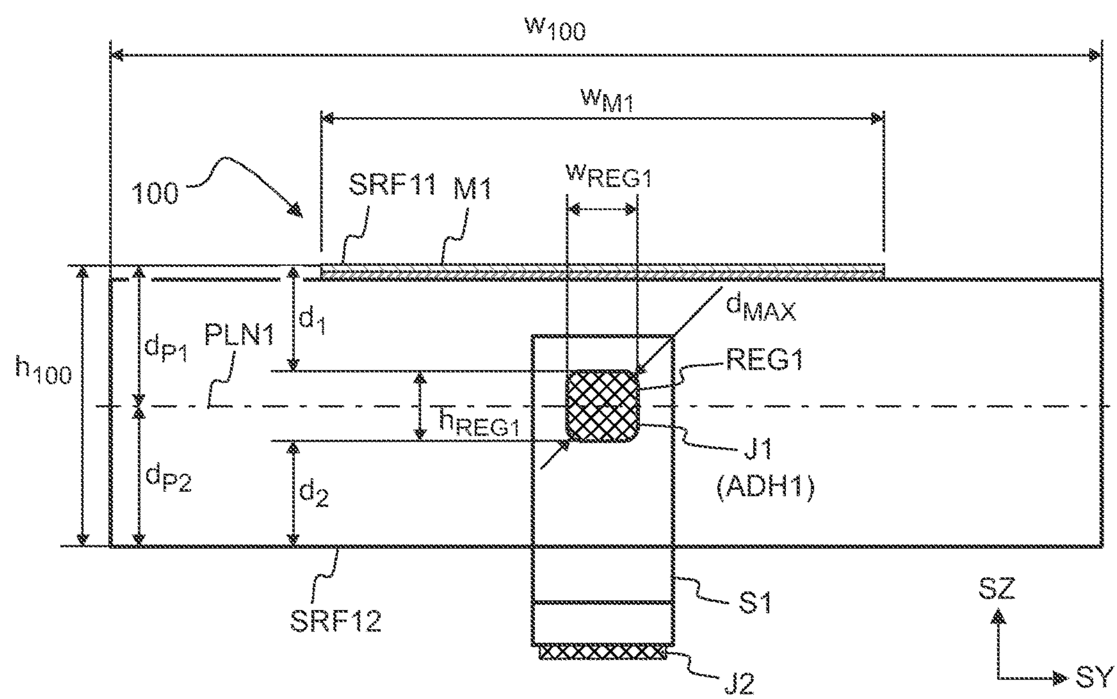
FIG. 5*b* shows, by way of example, in an end view, the joint of FIG. 5*a*.

Referring to FIGS. 5*a* and 5*b*, each supporting element S1 of the first mirror plate 100 may be bonded to the first mirror plate 100 by a joint J1. The mirror plate 100 may be bonded to one or more supporting elements S1 by three or more joints J1. In particular, the number of the joints J1 of the first mirror plate 100 may be equal to three in order to minimize internal stress of the mirror plate 100. The joints J1 may be e.g. adhesive joints. Each joint J1 may be bonded to the first mirror plate 100 at a bonding region REG1.

The mirror plate 100 may have a first surface SRF11 and a second surface SRF12. The surface SRF11 may be at least partly defined by the outer surface of the first mirror M1. The surface SRF11 may be parallel with the first mirror M1. The first surface SRF11 and a second surface SRF12 may define the thickness $h_{100}$ of the mirror plate 100. The second surface SRF12 may be e.g. substantially parallel with the first surface SRF11. The second surface SRF12 may also be slightly tilted with respect to the first surface SRF11 in order to reduce an effect of unwanted reflections. The first surface SRF11 and the second surface SRF12 may define a non-zero wedge angle.

The joints J1 of the first mirror plate 100 may be positioned close to the middle plane PLN1 of the first mirror plate 100. Positioning the joints J1 close to the middle plane may reduce or minimize geometric deformation of the mirrors M1, M2 away from the planar shape. A joint J1 may transfer a horizontal deforming force (e.g. in the direction SX) to the mirror plate.

The distance $d_1$ between each bonding region REG1 and the first substantially planar surface SRF11 may be e.g. greater than 30% of the thickness $h_{100}$ of the mirror plate 100, and the distance $d_2$ between each bonding region REG1 and the second substantially planar surface SRF12 may be e.g. greater than 30% of the thickness $h_{100}$ of the mirror plate 100.

The distance $d_1$ between each bonding region REG1 and the first substantially planar surface SRF11 may be e.g. greater than 30% of the thickness $h_{100}$ of the mirror plate 100, and the distance $d_3$ between the lowermost edge of each bonding region REG1 and the first substantially planar surface SRF11 may be e.g. smaller than 70% of the thickness $h_{100}$ of the mirror plate 100.

In particular, each bonding region REG1 may overlap the central plane PLN1 of the first mirror plate 100. The central plane PLN1 may meet each bonding region REG1 of the first mirror plate 100.

In case of a horizontal deforming force acting on the middle plane PLN1, resulting deformations of the upper surface SRF11 and the lower surface SRF12 may be substantially symmetric with respect to the middle plane PLN1. For example, a horizontal deforming force may cause a tendency of the upper surface SRF11 to deflect upwards, but this tendency may be effectively compensated by a corresponding tendency of the lower surface SRF12 to deflect downwards. Consequently, a deformation of the lower surface SRF12 may substantially compensate a deformation of the upper surface SRF11.

Causing the deforming force to act on the middle plane may minimize geometric deformation of the mirrors M1, M2. In particular, causing the deforming force to act on the middle plane may minimize bending of the mirrors M1, M2.

Each bonding region REG1 may be substantially perpendicular to the central plane PLN1 of the first mirror plate 100, e.g. in order to further ensure that horizontal forces are transferred symmetrically from the supporting elements S1 to the mirror plate.

Each bonding region REG1 may be located on a side surface (SRF10) of the mirror plate, the side surface (SRF10) being substantially perpendicular to the central plane PLN1 of the first mirror plate 100. A mirror plate 100 with perpendicular side surfaces (SRF10) may be substantially symmetrical with respect to the central plane PLN1, e.g. in order to minimize deformations and/or in order to simplify production of the mirror plate 100.

A joint J1 may also transfer a deforming torque to the mirror plate. The lo maximum dimension $d_{MAX}$ of the bonding region REG1 may be smaller than a predetermined limit in order to minimize or avoid transferring a deforming torque from the supporting element S1 to the mirror plate 100. For example, the maximum dimension $d_{MAX}$ of each bonding region REG1 of the first mirror plate 100 may be e.g. smaller than 30% of the thickness $h_{100}$ of the mirror plate 100.

The bonding region REG1 may have a first dimension $w_{REG1}$ in a first direction along the central plane PLN1, and the bonding region REG1 may have a second dimension $h_{REG1}$ in a second direction, which is perpendicular to the first direction. The first dimension $w_{REG1}$ may be e.g. the width of the bonding region REG1, and the second dimension $h_{REG1}$ may be e.g. the height of the bonding region REG1.

For example, the height $h_{REG1}$ of each bonding region REG1 of the first mirror plate 100 may be e.g. smaller than 30% of the thickness $h_{100}$ of the mirror plate 100. For example, the width $w_{REG1}$ of each bonding region REG1 of the first mirror plate 100 may also be e.g. smaller than 30% of the thickness $h_{100}$ of the mirror plate 100.

SX, SY, and SZ may denote orthogonal directions. The mirror M1 of the first mirror plate 100 may be in a plane defined by the directions SX and SY. SZ may denote the "vertical direction". A mirror plate may have an "upper" surface and a "lower" surface with respect to the direction SZ. The "upper" surface SRF11 may be above the "lower" surface SRF12 in the direction SZ. The "lower" surface SRF12 may be below the "upper" surface SRF11. Incoming light LB1 may propagate in the direction -SZ from the surface SRF21 to the surface SRF22. The mirror M1 may be below the mirror M2. Transmitted light LB2 may propagate in the direction -SZ from the surface SRF11 to the surface SRF12.

The distances $d_1$, $d_2$, $d_3$ may be defined in the direction of the optical axis (SZ).

The middle plane PLN1 of the first mirror plate 100 is at the halfway between the upper surface SRF11 and the lower surface SRF12. The distance dpi between the middle plane PLN1 and the upper surface SRF11 is equal to the distance $d_{P2}$ between the middle plane PLN1 and the lower surface SRF12.

The first surface SRF11 may be substantially parallel with the second surface SRF12. The middle plane PLN1 may be substantially parallel with the first surface SRF11.

The first surface SRF11 and the second surface SRF12 may also define a non-zero wedge angle e.g. in order to reduce unwanted reflections.

The supporting element S1 may also be e.g. an annular ring, which may be attached to the first mirror plate 100 by three joints J1.

Figure 5C:
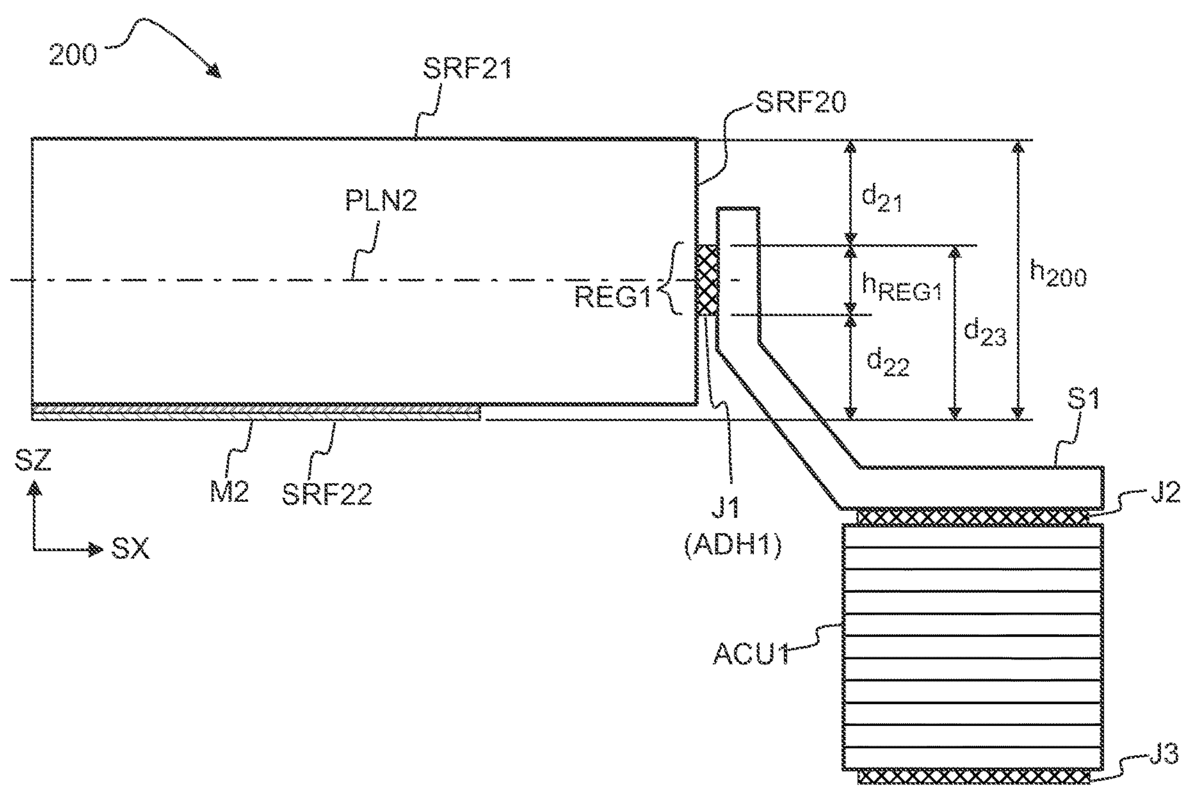
FIG. 5*c* shows, by way of example, in a side view, a joint of the second mirror plate.

Referring to FIG. 5*c*, each bonding region REG1 of the second mirror plate 200 may overlap the central plane PLN2 of the second mirror plate 200. The central plane PLN2 may meet each bonding region REG1 of the second mirror plate 200.

The second mirror plate 200 may have a first substantially planar surface SRF21 and a second substantially planar surface SRF22. The surface SRF22 may be at least partly defined by the outer surface of the second mirror M2. The surface SRF22 may be parallel with the mirror M2. The first substantially planar surface SRF21 and the second substantially planar surface SRF22 may define the maximum thickness $h_{200}$ of the second mirror plate 200. The middle plane PLN2 of the second mirror plate 200 is at the halfway between the upper surface SRF21 and the lower surface SRF22.

The first surface SRF21 may be substantially parallel with the second surface SRF22. The middle plane PLN2 may be substantially parallel with the surface SRF22. The first surface SRF21 and the second surface SRF22 of the plate 200 may also define a non-zero wedge angle e.g. in order to reduce an effect of unwanted reflections.

The second mirror plate 200 may be bonded to one or more first supporting elements S1 by three or more joints J1. Each joint J1 may be bonded to the second mirror plate 200 at a bonding region REG1. The distance $d_{21}$ between each bonding region REG1 and the first substantially planar surface SRF21 may be greater than 30% of the thickness $h_{200}$ of the second mirror plate, and the distance $d_{22}$ between each bonding region REG1 and the second substantially planar surface SRF22 may be greater than 30% of the thickness $h_{200}$ of the second mirror plate 200.

The distance $d_{22}$ between each bonding region REG1 and the substantially planar surface SRF22 may be greater than 30% of the thickness $h_{200}$ of the second mirror plate 200, and the distance $d_{23}$ between the uppermost edge of each bonding region REG1 and the substantially planar surface SRF22 may be smaller than 70% of the thickness $h_{200}$ of the second mirror plate 200.

The distances $d_{21}$, $d_{22}$, $d_{23}$ may be defined in the direction of the optical axis (SZ).

Each bonding region REG1 of the second mirror plate 200 may be substantially perpendicular to the first substantially planar surface SRF21 of the second mirror plate 200.

The maximum dimension $d_{MAX}$ of each bonding region REG1 of the second mirror plate 200 may be smaller than 30% of the thickness $h_{200}$ of the second mirror plate 200.

Figure 5D:
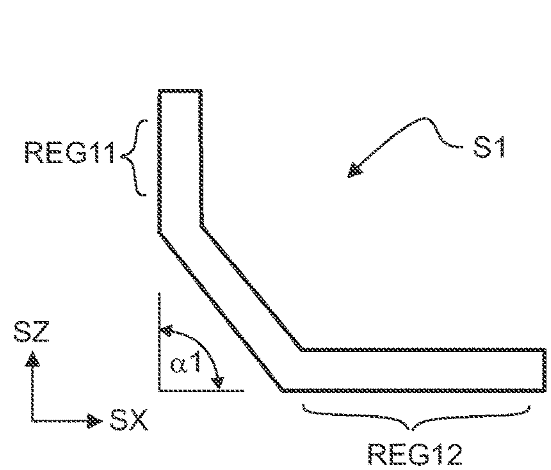
FIG. 5*d* shows, by way of example, in a side view, a support element for a mirror plate.
Figure 5E:
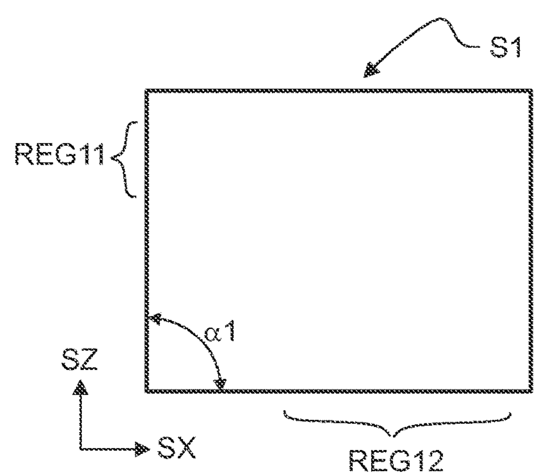
FIG. 5*e* shows, by way of example, in a side view, a support element for a mirror plate.

Referring to FIG. 5*d* and FIG. 5*e*, the supporting elements S1 may have a first bonding region REG11 and a second bonding region REG12. The first bonding region REG11 may be attached to the bonding region REG1 of the mirror plate (100, 200) by a joint J1. The second bonding region REG12 may be attached the surface SRF3 of the base plate BASE1 or a bonding surface of an actuator (ACU1) by a joint J2. After attaching, the first bonding region REG11 may be substantially perpendicular to the mirror M1, M2 of the mirror plate. After attaching, the second bonding region REG12 may be substantially parallel with the mirror M1, M2 of the mirror plate. An angle $\alpha 1$ between the regions REG11, REG12 may be substantially equal to 90 degrees. The flexible support element S1 of FIG. 5*d* may reduce the magnitude of forces transferred to the mirror plate. The support element of FIG. 5*e* may provide more stable support, when compared with the support element of FIG. 5*d*.

The mirrors M1, M2 may be rather close to each other. The interferometer 300 may be produced such that a target value of the mirror distance $d_F$ is e.g. in the range of 0.2 μm to 10 μm. The risk of mutual contact between the mirrors may be high when the target value is smaller than 0.5 μm.

Figure 1A:
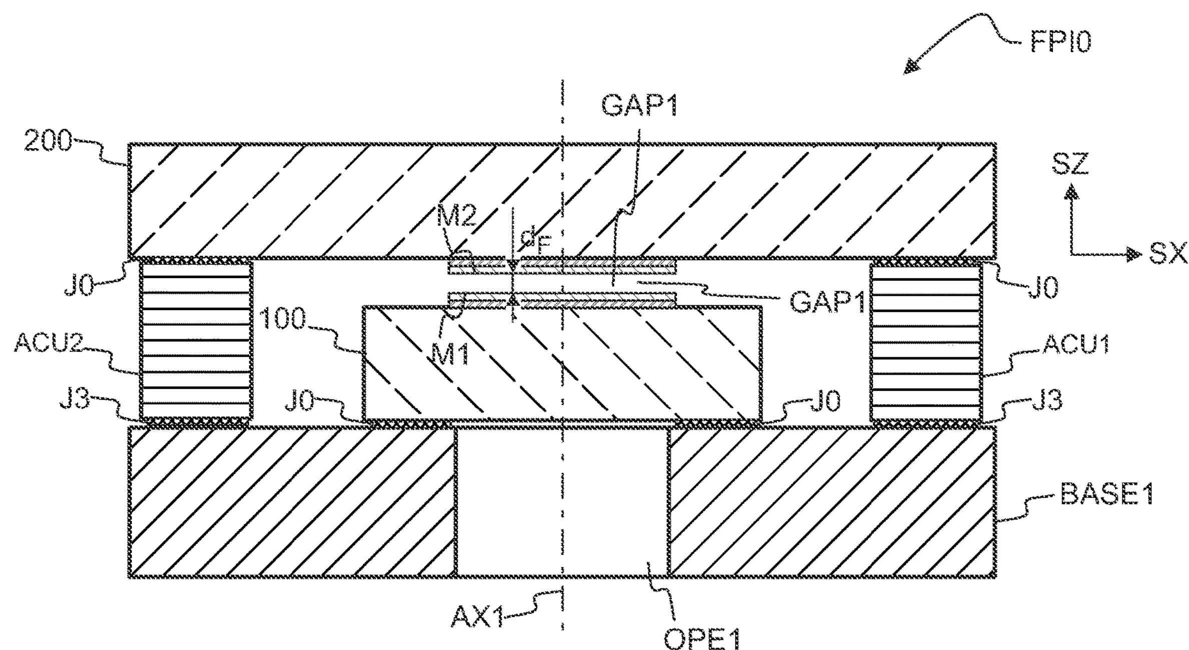
FIG. 1*a* shows, by way of example, in a cross-sectional side view, a Fabry-Perot interferometer of Prior Art.
Figure 1B:
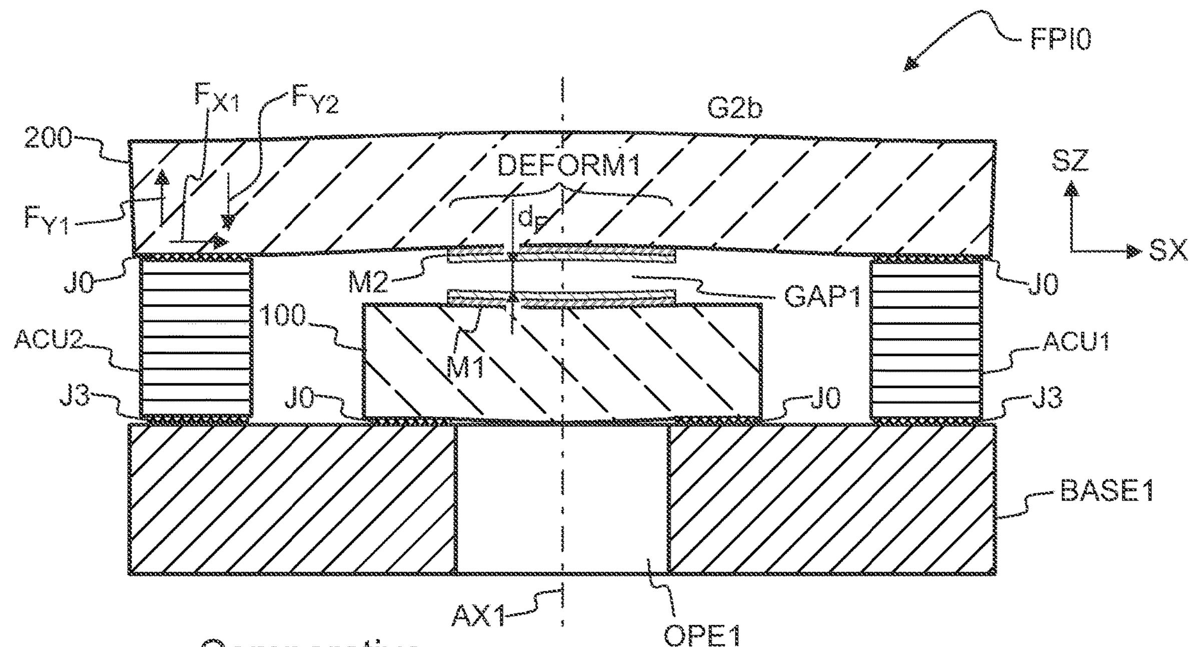
FIG. 1*b* shows, by way of example, in a cross-sectional side view, geometric deformation of the mirrors of the interferometer of FIG. 1*a*.

Accidental contact of the mirror M1 with the mirror M2 may cause permanent damage to the interferometer 300. For example, the mirrors, the actuators, and/or other structures of the interferometer 300 may be damaged in case of the contact. For example, in case of the comparative interferometer shown in FIG. 1*a*, shrinking of the joints J0 of the second plate 200 may pull the second plate 200 towards the first plate 100 so that mirror M1 may come into contact with the mirror M2.

Each bonding region REG1 may be substantially perpendicular to the central plane of the mirror plate. The perpendicular orientation of the bonding region REG1 may reduce the risk of damaging the interferometer 300 e.g. in case of shrinking and/or expansion of the joints. In an embodiment, the interferometer 300 may be produced e.g. such that the joints J1 are formed on the bonding regions REG1 after the joints J2, J3 have been formed, wherein the bonding regions REG1 may have said perpendicular orientation. For example, the joints J1 may be adhesive joints, which may be cured after the joints (J2, J3) have been formed.

In an embodiment, the interferometer 300 may be produced such that the joints J2 for the first mirror plate 100 and the joints J2 for the second mirror plate 200 are cured substantially simultaneously at a substantially similar rate, so as to reduce or minimize relative movement of the second mirror plate 200 with respect to the first mirror plate during said curing. Consequently, the risk of damaging the mirrors M1, M2 due to mutual contact may be reduced.

Figure 6A:
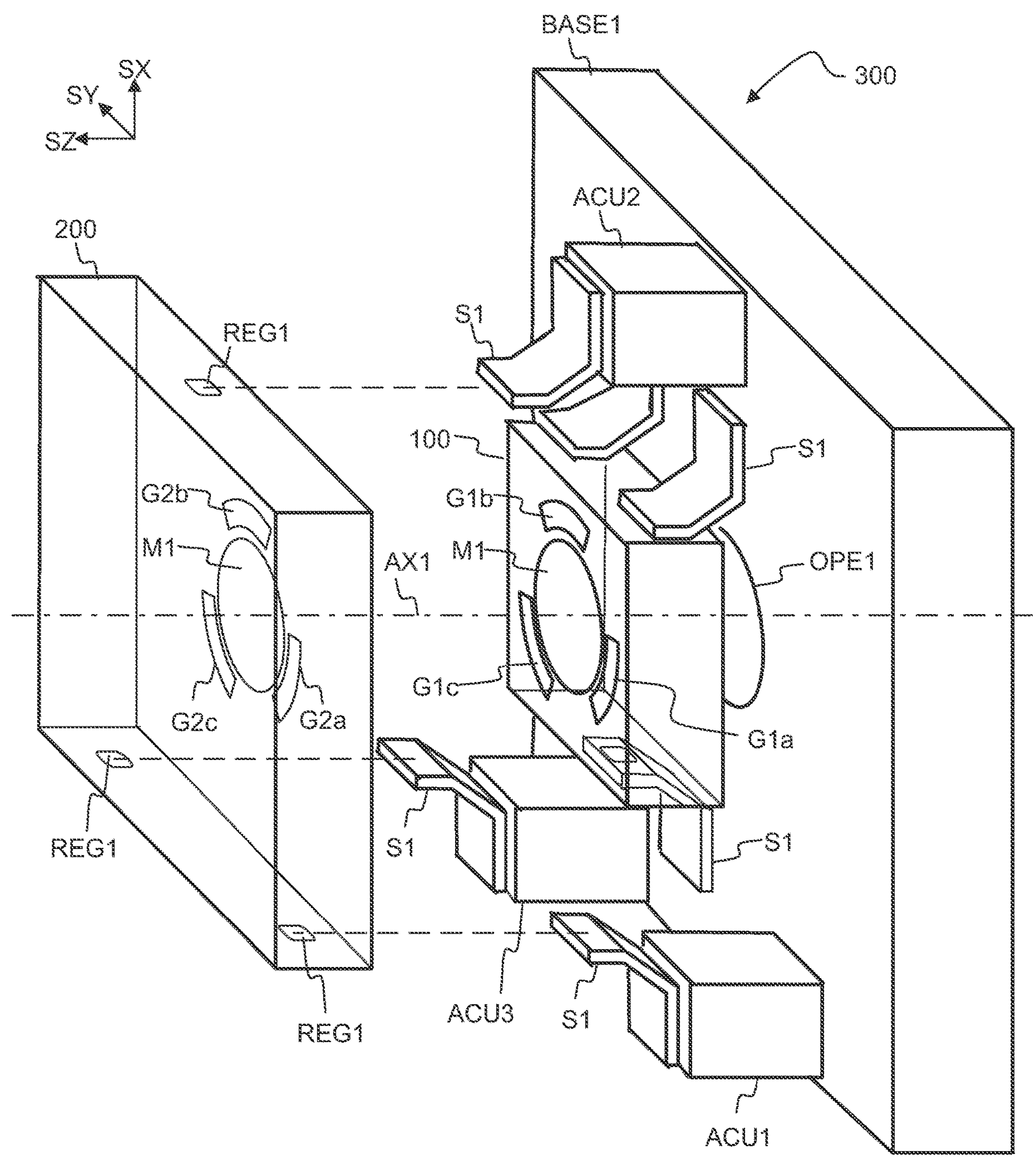
FIG. 6*a* shows, by way of example, an exploded three-dimensional view of the Fabry-Perot interferometer.

FIG. 6*a* shows, by way of example, in a three-dimensional exploded view of a Fabry-Perot interferometer 300. The interferometer 300 may comprise a first mirror plate 100, a second mirror plate 200, and three actuators ACU1, ACU2, ACU3. The first mirror plate 100 may be supported by three joints J1, and the second mirror plate 200 may be supported by three joints J1. The first mirror plate 100 may be attached to the base plate BASE1 via the joints J1 and via supporting elements S1. The second mirror plate 200 may be attached to the actuators ACU1, ACU2, ACU3 via the joints J1 and via supporting elements S1.

Using the three actuators may allow adjusting an average value of the mirror distance $d_F$ and adjusting the tilt of the mirror M2 about a first axis (e.g. direction SX) and about a second axis (e.g. direction SY).

The interferometer 300 may comprise sensor electrodes G1*a*, G2*a*, G1*b*, G2*b*, G3*a*, G3*c* to implement three or more sensor capacitors. Using the three or more sensor capacitors may allow monitoring the average value of the mirror distance $d_F$ and monitoring the tilt of the mirror M2 about a first axis and about a second axis. The monitoring unit 410 may comprise multiple inputs for the sensor capacitors. The sensor electrodes may be arranged to monitor the alignment of the second mirror plate 200 with respect to the first mirror plate 100. For example, a non-zero difference between the capacitance of a first sensor capacitor (formed by electrodes G1*a*, G2*a*) and the capacitance of a third sensor capacitor (formed by electrodes G1*c*, G2*c*) may indicate that the second plate 200 is tilted about the axis SX.

Figure 6B:
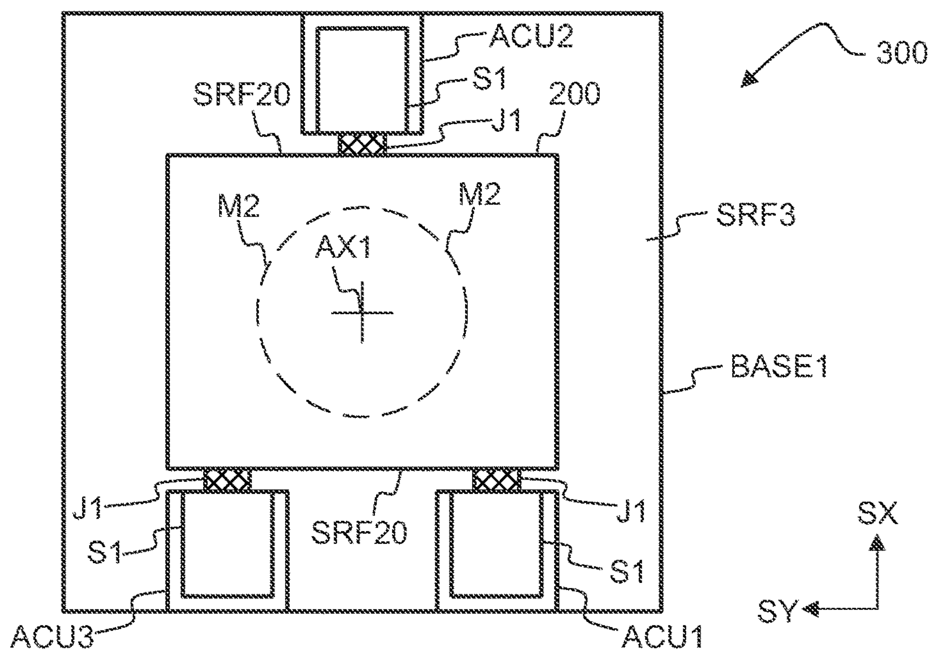
FIG. 6*b* shows, by way of example, in a top view, positions of support elements with respect to the second mirror plate.
Figure 6C:
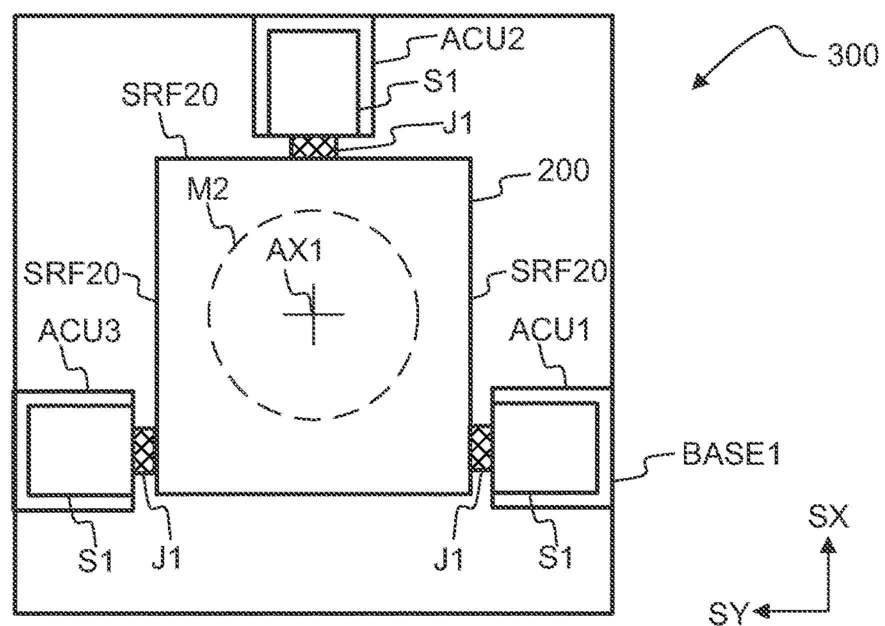
FIG. 6*c* shows, by way of example, in a top view, positions of support elements with respect to the second mirror plate.
Figure 6D:
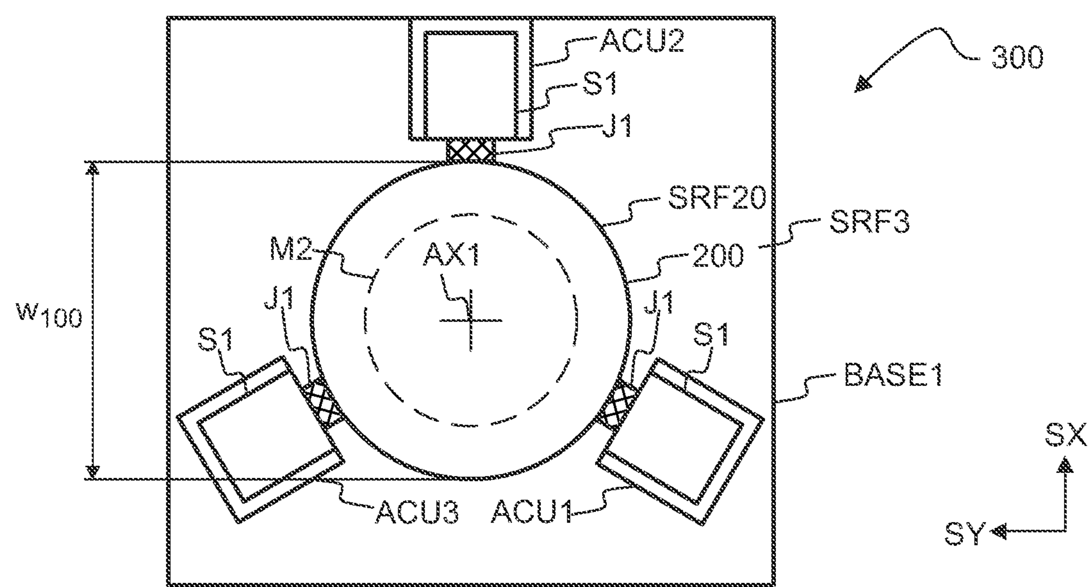
FIG. 6*d* shows, by way of example, in a top view, positions of support elements with respect to the second mirror plate.

FIGS. 6*b*, 6*c*, and 6*d* show, by way of example, in a top view, different positions of support elements S1 for supporting the mirror plate 200 of the interferometer 300. FIGS. 6*b* and 6*c* show supporting a substantially rectangular mirror plate 200. FIG. 6*d* shows supporting a substantially circular mirror plate 200.

Referring to FIG. 7*a*, the interferometer 300 may comprise one or more capacitive sensors C1 for monitoring the mirror distance $d_F$. The sensor C1 may comprise a first sensor electrode G1*a*, a second sensor electrode G2*a*, and an intermediate sensor electrode G0*a*. The electrodes G1*a*, G2*a* may be attached to the first stationary mirror plate 100. The intermediate electrode G0*a* may be attached to the movable second mirror plate 200. When using the intermediate electrode G0*a*, it is not necessary to connect conductors CONa, CONb to the movable mirror plate 200. Avoiding the use of movable conductors may provide e.g. simplified construction, faster response and/or more reliable operation.

The first electrode and the intermediate electrode may form a first capacitor C11. The intermediate electrode and the second electrode may form a second capacitor C12. The capacitive sensor C1 may comprise the capacitors C11 and C12, which may be connected in series via the intermediate electrode G0*a*. The electrodes G1*a*, G2*a* of the sensor capacitor C1 may be connected to a capacitance monitoring unit 410 e.g. by conductors CONa, CONb. The capacitance monitoring unit 410 may provide a sensor signal $S_d$ indicative of the mirror distance $d_F$.

Figure 7B:
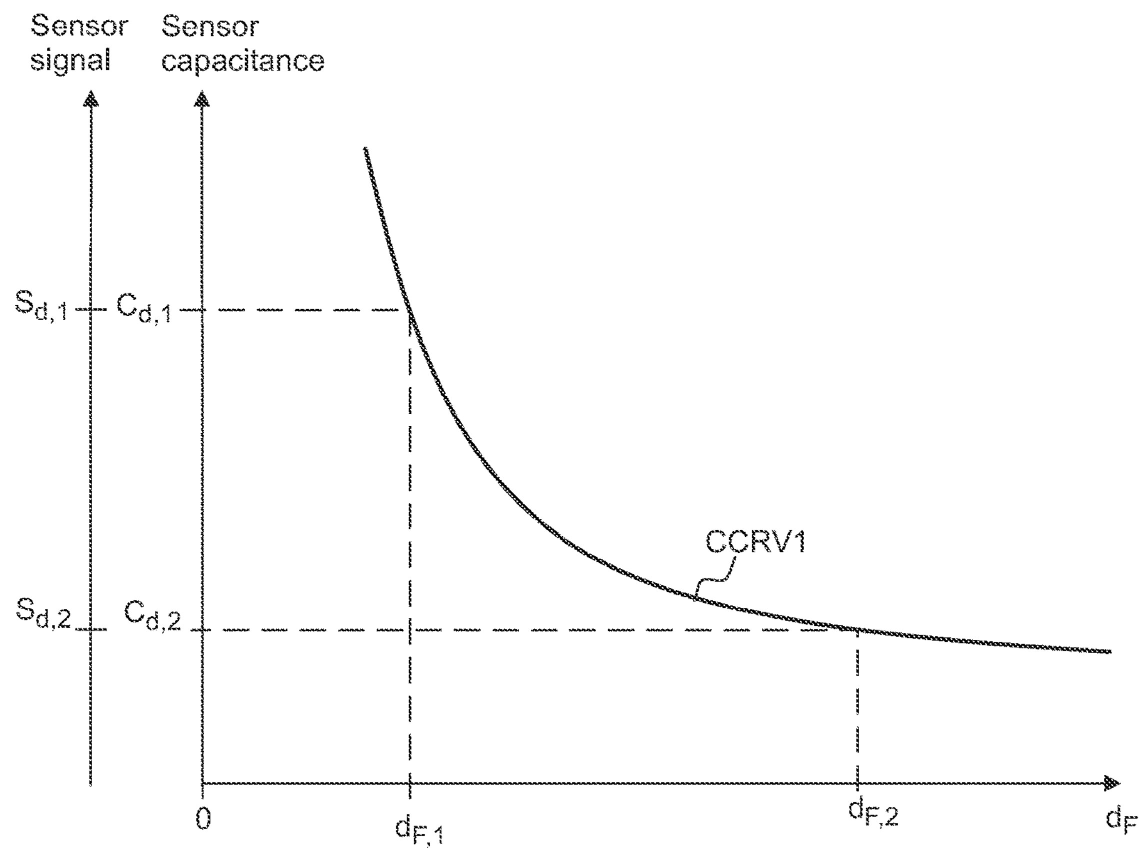
FIG. 7*b* shows, by way of example, determining a distance between the mirrors by monitoring a capacitor signal.
Figure 8:
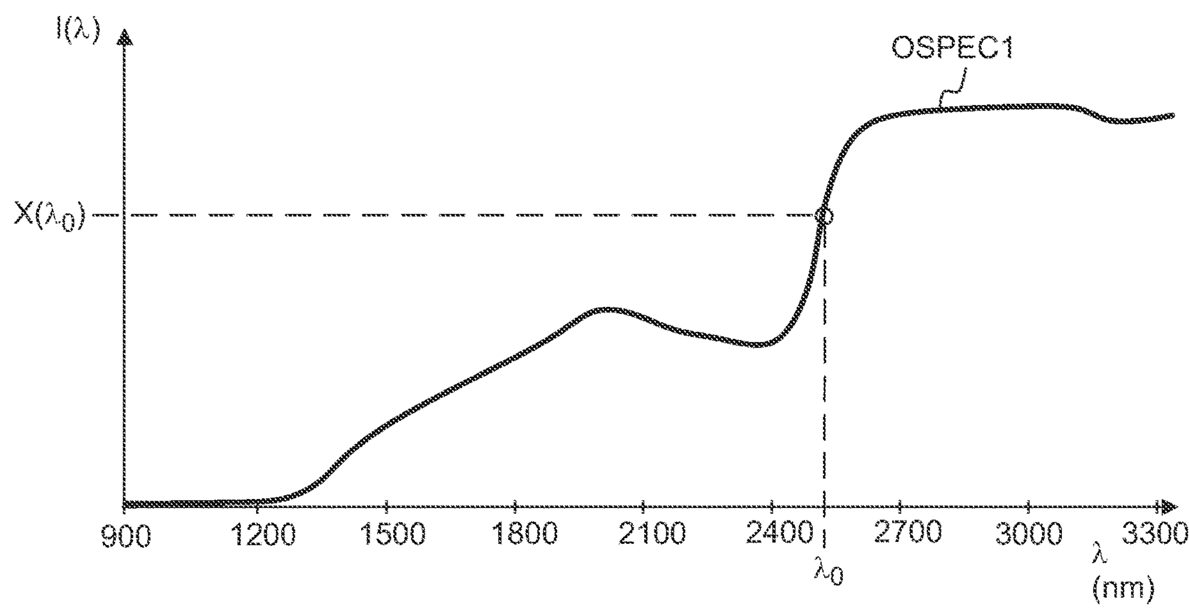
FIG. 8 shows, by way of example, measuring spectral intensity by using the interferometer.

FIG. 7*b* shows, by way of example, a relation between the mirror distance $d_F$ and the capacitance value $C_d$ of a sensor capacitor. The curve CCRV1 of FIG. 8 shows the sensor capacitance $C_d$ as the function of the mirror gap $d_F$. To the first approximation, the value of the sensor capacitance $C_d$ may be inversely proportional to the value of the electrode distance. $C_{d,1}$ denotes the sensor capacitance at a first mirror distance value $d_{F,1}$. $C_{d,2}$ denotes the sensor capacitance at a second mirror distance value $d_{F,2}$.

The control unit CNT1 may be arranged to determine the value of the mirror distance $d_F$ from the measured value of the sensor capacitance $C_d$. The capacitance monitoring unit 410 may provide a sensor signal value $S_{d,1}$ when the sensor capacitance has a value $C_{d,1}$. The capacitance monitoring unit 410 may provide a sensor signal value $S_{d,2}$ when the sensor capacitance has a value $C_{d,2}$.

FIG. 8 shows, by way of example, the spectral intensity $I(\lambda)$ of light LB1 received from an object OBJ1. The spectral intensity $I(\lambda)$ may have a value $X(\lambda_0)$ at a wavelength $\lambda_0$. The value $X(\lambda_0)$ may be determined from the detector signal $S_{DET1}$ obtained from the optical detector DET1. The wavelength $\lambda_0$ may be selected by adjusting the mirror gap $d_F$ before the detector signal $S_{DET1}$ is obtained from the optical detector DET1. The mirror gap $d_F$ may be scanned during a measurement in order to measure spectral range of the spectrum OSPEC1 of the object OBJ1.

The object OBJ1 may be e.g. a real object or a virtual object. A real object OBJ1 may be e.g. in solid, liquid, or gaseous form. The real object OBJ1 may be a cuvette filled with a gas. The real object OBJ1 may be e.g. a plant (e.g. tree or a flower), a combustion flame, or an oil spill floating on water. The real object OBJ1 may be e.g. the sun or a star observed through a layer of absorbing gas. The real object may be e.g. an image printed on a paper. A virtual object OBJ1 may be e.g. an optical image formed by another optical device.

The interferometer 300 may be suitable for filtering and/or analyzing infrared light. The materials and the dimensions of the mirror plate 100 may be selected such that a Fabry Perot interferometer 300 comprising the mirror plate 100 may be applicable for spectral analysis of infrared light.

The Fabry-Perot interferometer may be used as an optical filter, which has a variable mirror gap. An optical device may comprise one or more Fabry-Perot interferometers. The optical device may be e.g. a non-imaging spectrometer, an imaging spectrometer, a chemical analyzer, a biomedical sensor, and/or a component of a telecommunication system.

The first mirror plate 100 may be e.g. rectangular or circular, when viewed in the direction of the optical axis AX1 (direction −SZ). The second mirror plate 200 may be e.g. rectangular or circular, when viewed in the direction of the optical axis AX1. The first mirror plate 100 may be smaller than the second mirror plate 200, the first mirror plate 100 may be larger than the second mirror plate 200, or the mirror plates 100, 200 may be of equal size. The width or diameter $w_{100}$ of the first mirror plate 100 may also be greater than or equal to the width or diameter wax) of the second mirror plate 200.

The term “plate” may refer to a body, which has one or more substantially planar portions. The plate may have a first substantially planar portion so as to minimize wavefront distortion of light transmitted and/or reflected by said planar portion. The plate may optionally have a second substantially planar portion, so as to minimize wavefront distortion of light transmitted through the first substantially planar portion and the second substantially planar portion. The first planar portion may cover the entire top surface of the plate, or the first planar portion may cover less than 100% of the top surface of the plate. The second planar portion may cover the entire bottom surface of the plate, or the second planar portion may cover less than 100% of the bottom surface of the plate. The plate may optionally have e.g. one or more protruding portions and/or recessed portions. In an embodiment, first planar portion may be substantially parallel to the second planar portion. In an embodiment, first planar portion and the second planar portion may define a non-zero wedge angle e.g. in order to reduce unwanted reflections.

The supporting blocks S1 may provide more stable support for the mirror plate M1 and/or M2, when compared with the slightly flexible supporting elements. In an embodiment, the first supporting elements S1 may be rigid. In particular, the supporting blocks S1 may be implemented as rigid non-flexible elements S1.

In an embodiment, the interferometer 300 may be produced such that the joints J2 are formed after the joints J1 and J3 have been formed. For example, the joints J2 may be adhesive joints, which may be cured after the joints J1 and J3 have been formed.

The width $w_{100}$ of the first mirror plate 100 may be e.g. in the range of 5 mm to 100 mm. In particular, the width $w_{100}$ of the first mirror plate 100 may be e.g. in the range of 5 mm to 50 mm.

The materials and the dimensions of the mirror plate 100 may also be selected such that a Fabry-Perot interferometer 300 comprising the mirror plate 100 may be applicable for spectral analysis of visible light. The operating wavelength range of the interferometer may include e.g. the range of 380 nm to 760 nm.

The materials and the dimensions of the mirror plate 100 may also be selected such that a Fabry-Perot interferometer 300 comprising the mirror plate 100 may be applicable for spectral analysis of ultraviolet light. The operating wavelength range of the interferometer may include e.g. the range of 150 nm to 380 nm.

An operating wavelength $\lambda_N$ of the Fabry-Perot interferometer 300 may be e.g. in the range of 150 nm to 6000 nm.

Various embodiments are illustrated by the following examples.

Example 1. A Fabry-Perot interferometer (300), comprising:

a first mirror plate (100) comprising a first semi-transparent mirror (M1), a second semi-transparent mirror (M2) to define an optical cavity together with the first mirror (M1), and one or more first supporting elements (S1) to support the first mirror plate (100), wherein the first mirror plate has a first substantially planar surface (SRF11) and a second substantially planar surface (SRF12) defining the maximum thickness ($h_{100}$) of the first mirror plate (100), wherein the first mirror plate (100) is bonded to the one or more first supporting elements (S1) by three or more joints (J1), wherein each joint (J1) is bonded to the first mirror plate (100) at a bonding region (REG1), wherein the distance ($d_1$) between each bonding region (REG1) and the first substantially planar surface (SRF11) is greater than 30% of the thickness ($h_{100}$) of the mirror plate (100), and the distance ($d_2$) between each bonding region (REG1) and the second substantially planar surface (SRF12) is greater than 30% of the thickness ($h_{100}$) of the mirror plate (100).

Example 2. The interferometer (300) of example 1, wherein each bonding region (REG1) of the first mirror plate (100) overlaps the central plane (PLN1) of the first mirror plate (100).

Example 3. The interferometer (300) of example 1 or 2, wherein a maximum dimension ($d_{MAX}$) of each bonding region (REG1) of the first mirror plate (100) is smaller than 30% of the thickness ($_{100}$) of the mirror plate (100).

Example 4. The interferometer (300) according to any of examples 1 to 3, wherein each bonding region (REG1) of the first mirror plate (100) is substantially perpendicular to the first substantially planar surface (SRF11) of the first mirror plate (100).

Example 5. The interferometer (300) according to any of examples 1 to 4, wherein the joints (J1) are adhesive joints (ADH1).

Example 6. The interferometer (300) according to any of examples 1 to 5, wherein the first supporting elements (S1) are flexible.

Example 7. The interferometer (300) according to any of examples 1 to 6, comprising three actuators (ACU1, ACU2, ACU3) to change a distance ($d_F$) between the first mirror (M1) and the second mirror (M2).

Example 8. The interferometer (300) according to any of examples 1 to 7, comprising a second mirror plate (200), second supporting elements (S1), a base plate (BASE1), and three actuators (ACU1, ACU2, ACU3) wherein the second mirror plate (200) comprises the second semi-transparent mirror (M2), wherein the first mirror plate (100) is attached to the base plate (BASE1) by three supporting elements (S1), wherein the actuators (ACU1, ACU2, ACU3) are bonded to the base plate (BASE1), wherein the second mirror plate (200) is attached to the actuators (ACU1, ACU2, ACU3) by the second supporting elements (S1).

Example 9. The interferometer (300) according to any of examples 1 to 8, comprising a second mirror plate (200) comprising the second semi-transparent mirror (M2), and one or more second supporting elements (S1) to support the first mirror plate (100), wherein the second mirror plate (200) has a first substantially planar surface (SRF21) and a second substantially planar surface (SRF22) defining the maximum thickness ($h_{200}$) of the second mirror plate (200), wherein the second mirror plate (200) is bonded to the one or more second supporting elements (S1) by three or more joints (J1), wherein each joint (J1) is bonded to the second mirror plate (200) at a bonding region (REG1), wherein the distance ($d_{21}$) between each bonding region (REG1) and the second substantially planar surface (SRF21) is greater than 30% of the thickness ($h_{200}$) of the mirror plate (200), and the distance ($d_{22}$) between each bonding region (REG1) and the second substantially planar surface (SRF22) is greater than 30% of the thickness ($h_{200}$) of the mirror plate (200).

For the person skilled in the art, it will be clear that modifications and variations of the devices and methods according to the present disclosure are perceivable. The figures are schematic. The particular embodiments described above with reference to the accompanying drawings are illustrative only and not meant to limit the scope of the disclosed embodiments, which is defined by the appended claims.

The invention claimed is:

1. A Fabry-Perot interferometer, comprising:

a first mirror plate comprising a first semi-transparent mirror, a second semi-transparent mirror to define an optical cavity together with the first semi-transparent mirror, and one or more first supporting elements to support the first mirror plate, wherein the first mirror plate has a first substantially planar surface and a second substantially planar surface defining a maximum thickness of the first mirror plate, wherein the first mirror plate is bonded to the one or more first supporting elements by three or more joints, wherein the first mirror plate has bonding regions, wherein each bonding region of the first mirror plate is substantially perpendicular to the first substantially planar surface of the first mirror plate, wherein a distance between the first substantially planar surface and each bonding region of the first mirror plate is greater than 30% of the thickness of the mirror plate, and a distance between the second substantially planar surface and each bonding region of the first mirror plate is greater than 30% of the thickness of the mirror plate, wherein the bonding regions of the first mirror plate are regions where the first mirror plate is bonded to the joints, wherein a distance between the first semi-transparent mirror and the second semi-transparent mirror is in the range of 0.2 μm to 10 μm, and wherein the one or more first supporting elements are attached to a mounting surface of a base plate by an adhesive joint.

2. The interferometer of claim 1, wherein each bonding region of the first mirror plate overlaps the central plane of the first mirror plate.

3. The interferometer of claim 1, wherein a maximum dimension of each bonding region of the first mirror plate is smaller than 30% of the thickness of the first mirror plate.

4. The interferometer according to claim 1, wherein the joints are adhesive joints.

5. The interferometer according to claim 1, wherein the one or more first supporting elements are flexible.

6. The interferometer according to claim 1, further comprising three actuators to change the distance between the first semi-transparent mirror and the second semi-transparent mirror.

7. The interferometer according to claim 1, further comprising a second mirror plate, one or more second supporting elements, and three actuators, wherein the second mirror plate comprises the second semi-transparent mirror, wherein the one or more first supporting elements comprise three first supporting elements, wherein the actuators are bonded to the base plate, wherein the second mirror plate is attached to the actuators by the one or more second supporting elements.

8. The interferometer according to claim 1, further comprising a second mirror plate comprising the second semi-transparent mirror, and one or more second supporting elements to support the second mirror plate, wherein the second mirror plate has a first substantially planar surface and a second substantially planar surface defining the maximum thickness of the second mirror plate, wherein the second mirror plate is bonded to the one or more second supporting elements by three or more joints, wherein the second mirror plate has bonding regions, wherein each bonding region of the second mirror plate is substantially perpendicular to the first substantially planar surface of the second mirror plate, wherein a distance between the first substantially planar surface of the second mirror plate and each bonding region of the second mirror plate is greater than 30% of the thickness of the second mirror plate, and a distance between the second substantially planar surface of the second mirror plate and each bonding region of the second mirror plate is greater than 30% of the thickness of the second mirror plate, and wherein the boding regions of the second mirror plate are regions where the second mirror plate is bonded to the joints.

9. The interferometer according to claim 1, wherein the first mirror plate is disposed between the second mirror plate and the base plate.

* * * * *